United States Patent [19]

Engstrom et al.

[11] 3,942,990

[45] Mar. 9, 1976

[54] METHOD FOR PRODUCING FOAMED CERAMICS

[75] Inventors: Carl Bengt Alfred Engström, Uttran; Hans Georg Klang, Sodertalje; Gösta Persson, Bromolla, all of Sweden

[73] Assignee: EUROC Administration AB, Malmo, Sweden

[22] Filed: July 9, 1973

[21] Appl. No.: 377,689

[30] Foreign Application Priority Data

July 13, 1972 Sweden............................ 9231/72

[52] U.S. Cl.............. 106/40 R; 106/73.5; 106/73.6
[51] Int. Cl.² ............................................ C03C 3/22
[58] Field of Search...... 106/40 R, 73.5, 40 V, 73.6, 106/DIG. 1, DIG. 56, 44

[56] References Cited

UNITED STATES PATENTS

| | | | |
|---|---|---|---|
| 1,944,007 | 1/1934 | Hobart | 106/40 R |
| 2,123,536 | 7/1938 | Long | 106/40 V |
| 2,544,752 | 3/1951 | Gelbman | 106/DIG. 1 |
| 2,611,712 | 8/1952 | Ford | 106/40 V |
| 2,948,948 | 8/1960 | Duplin et al. | 106/40 R |
| 2,987,411 | 6/1961 | Minnick | 106/DIG. 1 |
| 3,325,264 | 6/1967 | Marceau | 106/40 R |

Primary Examiner—Winston A. Douglas
Assistant Examiner—John F. Niebling
Attorney, Agent, or Firm—Fred Philpitt

[57] ABSTRACT

A method for the manufacture of foamed ceramics from a starting composition containing at least one component, which, when heated, forms a viscous, sintered and porous mass and a relatively difficultly oxidizable pore-forming agent for producing the porous structure, characterized by using as the starting composition a composition containing (1) at least one waste product rich in silica and containing readily oxidizable substances which, when heated, are themselves capable of producing uncontrollable pore formation and/or an undesirable melt, and (2) a strongly oxidizing agent, the quantity of oxidizing agent being such that the oxidizable substances are oxidized to eliminate or to reduce the uncontrollable pore formation and/or the melting and wherein the desired pore structure is obtained by oxidation of the difficultly oxidizable carbonaceous pore-forming agent.

8 Claims, No Drawings

3,942,990

METHOD FOR PRODUCING FOAMED CERAMICS

The present invention relates to a method for the manufacture of foamed ceramics. The expression "foamed ceramics" as used here is intended also to embrace such products as those normally designated "foamed glass" ("cellular glass"). These products combine good mechanical strength with low volumetric weight and have an emphasized cellular structure which render said products highly suitable for heat insulating purposes.

More specifically, the present invention relates to a method for producing foamed ceramics from a starting material which contains one or more components which when heated form a viscous, sintered and porous body, and a relatively difficultly oxidized pore-forming agent for creating the porous structure.

Such methods are known to the art. One serious disadvantage with known methods, however, is that the end products are relatively expensive, and consequently the possibility of being able to use very inexpensive waste materials rich in silica as components in the starting composition is highly desirable. Examples of the materials envisaged include fly ash obtained from waste-heat boilers, dust obtained from electrometallurgical furnaces and dust obtained when crushing macadam. Experiments made with such waste products have shown that they cannot be used for the purpose envisaged when applying techniques at present known to the art. The reason for this is that the products contain substances which oxidize at relatively low temperatures and which, when heated to produce the porous structure desired, give rise to an uncontrollable pore formation and/or an undesirable low-viscous melt. Uncontrollable pore formation can occur if the starting composition contains carbon or carbonaceous substances, while undesirable (premature) melting occurs if said starting substance contains oxides in a low valency stadium, e.g. FeO. Such oxides have the ability to form relatively readily melted eutectic compositions, so that melting may take place prematurely, at a point undesirable with respect to the formation of pores.

A combination of these effects can also occur, insomuch as carbon or carbonaceous substances reduce oxides, e.g. $Fe_2O_3$ to a lower valency state when heating to the temperature at which the foamed ceramic is formed.

On the basis of the aforegoing it was found that the inexpensive waste products envisaged could be used for producing foamed ceramics, if the starting composition was admixed with an oxidizing agent capable of reacting with the oxidizable substances in said starting material and of later reacting with the added difficultly oxidized pore-forming agent, to form the porous structure determinative of the properties of the finished product.

The invention is mainly characterized by, on the basis of the above, using as a starting material for producing foamed ceramics a composition containing (1) at least one waste product rich in silica and containing readily oxidizable substances which, when heated, are themselves capable of producing uncontrollable pore formation and/or an undesirable melt, and (2) a strongly oxidizing agent, the quantity of oxidizing agent being such that the oxidizable substances are oxidized to eliminate or to reduce the uncontrollable pore formation and/or the melting and wherein the desired pore structure is obtained by oxidation of the difficultly oxidizable carbonaceous pore-forming agent.

The difficultly oxidizable pore-forming agent envisaged is primarily a carbonaceous agent.

One common feature of the starting materials used in accordance with the present invention, and having the character of waste material, is that they shall have a relatively high silica content and be very finely divided. The aforementioned waste materials, i.e. dust removed from waste gases emanating from electrometallurgical processes and dust trapped in stone crushing plants, for example in conjunction with the manufacture of macadam, possess the aforementioned combination of properties.

According to the invention, the starting composition can be admixed with other products for the purpose of correcting the ceramic analysis. Examples of such products are natural minerals, e.g. feldspar, glacial clay, quartz, diabase, nepheline syenite, kaolin, or mixtures thereof, for example sand.

In accordance with the invention, the starting composition may contain between approximately 25% and approximately 80% waste product rich in silica, calculated on the weight of the starting mixture.

Dust trapped when crushing stones comprises natural minerals, such as feldspar, quartz, diabase etc. Such dusts usually have a specific surface which is smaller than that of dust obtained from metallurgical processes, e.g. 3000–4000 $cm^2/g$ as opposed to >10000 $cm^2/g$. If dust obtained from stone crushing operations is used alone, it is preferably ground further to a specific surface of approximately 8000 $cm^2/g$, in order to provide for a sufficiently high reaction rate when sintering.

It has been found that this extra grinding step can be avoided when the crushed-stone dust is mixed with flue dust.

In order for an acceptable foamed ceramic to be obtained when sintering in accordance with the present invention, the starting materials shall have the following chemical composition. With regard to each specific raw material used, however, a test must be made for the purpose of determining in each particular case the suitable analyses.

| | |
|---|---|
| 60 – 75 % $SiO_2$ | (glass former) |
| 5 – 13 % $Al_2O_3 + Fe_2O_3$ | (glass stabilizer) |
| approximately 2 % CaO | (glass stabilizer) |
| 0 – 6 % MgO | (glass stabilizer) |
| 10 – 15 % $Na_2O + K_2O$ | (fluxing agent) |

It has been found that the reaction rate can be increased in the melting process by using alkalihydroxide as the fluxing agent. More specifically, it has been found that at least 80% of the fluxing agent should be alkalihydroxide. This hydroxide is very active, since it dissolves to a concentrated aqueous solution and is able to retain its activity when heated. The alkalihydroxide is very reactive at those temperatures envisaged for forming the foamed ceramic according to the present invention. Further, alkalihydroxide forms eutectic melts with other components, primarily with silica and $Al_2O_3$. The quantity of "active alkali" should be carefully adjusted in relation to the other components of the composition, since excessive quantity of active alkali can result in an impaired resistance of the product to water, while an insufficient quantity prevents a sufficient quantity of molten phase from being formed at the desired low temperature, at which products having a relatively high volumetric weight are obtained.

In accordance with the invention the oxidizing agent normally used is an inorganic agent. Examples of oxidizing agents used with the present invention include manganese dioxide, nitrates, permanganates etc. As previously mentioned, the oxidizing agent is operative in combusting all free carbon, and also sulphur at a relatively low temperature, optionally in combination with air, at which sintering has not yet started to take place, and to oxidize up all divalent dioxides to trivalent iron oxides and/or prevent the higher oxides such as $Fe_2O_3$ and $SO_3$, for example, from being reduced.

Since all free carbon, which normally serves as a pore-forming agent in ceramic processes, is oxidized away, additional pore-forming agents must be added. Silicon carbide, which is a carbonaceous pore-forming agent, has been found suitable in this connection. The silicon carbides will not react with the oxidizing agent until the composition is in molten form, whereafter they form the desired pore structure.

In accordance with one embodiment of the present invention, the starting composition can be admixed with a hydraulic binding agent or latent hydraulic binding agent, and, subsequent to solidifying, the resulting composition can be crushed into smaller pieces, which are then heated to form the foamed ceramic.

The following procedure can be applied when producing foamed ceramics: a finely divided waste dust rich in silica and optionally admixed with natural mineral (together approximately 80% of the dry weight of the composition) may be mixed, e.g. by wet grinding in a ball mill, with an approximately 10 - 15% aqueous solution of alkalihydroxide, 3 - 4% hydraulic or latent hydraulic binding agent, e.g. Portland cement binders or blast furnace slag, 1 - 3% of a strongly oxidizing agent, e.g. manganese dioxide, and 0.1 - 0.5% pore-forming agent, e.g. silicon carbide, whereafter the thus obtained slurry may be dewatered to produce thin-walled, porous nodules or a fine-grained product. The product is then heated very rapidly to approximately 800° - 900°C in special moulds, at which temperature a melt is formed. The reaction between the pore-forming agent and the remaining surplus of oxidizing agent causes a gaseous product to be formed, which forms pores in the melt. The porous product obtains a very uniform pore structure. The product is then rapidly chilled to approximately 600°C, whereafter it is allowed to cool slowly in a cooling furnace.

According to one embodiment of the invention, the starting composition can be prepared in the form of an aqueous mixture and said mixture subjected to a spray drying step before the melting process.

According to another embodiment of the invention, the starting material can be subjected to a roasting step in order to convert the carbon to oxides, when said starting material or the waste product rich in silica contains a relatively large quantity of carbon or carbonaceous material. It is not possible with such a roasting operation to oxidize away, completely, carbonaceous oxidizable substances.

The invention will now be described by means of a number of examples.

EXAMPLE 1

An aqueous raw material mass having the following composition was produced:

| | | |
|---|---|---|
| Flue dust | 55 kg $SiO_2$-content approx. 90 %, | spec. surface approx. 30000 $cm^2/g$ |
| Dust from crushed stones | 10 kg $SiO_2$-content approx. 75 %, | spec. surface approx. 4000 $cm^2/g$ |
| Glacial clay | 17 kg $SiO_2$-content approx. 58 % | |
| Granulated blast furnace slag | 3 kg $SiO_2$-content approx. 40 %, | spec. surface approx. 3000 $cm^2/g$ |
| Sodium hydroxide | 13 kg $SiO_2$-content approx., commercial quality | |
| Pyrolusite | 1.8 kg $MnO_2$, commercial quality | |
| Silicon carbide | 0.2 kg particle size <5 $\mu$ | |
| Water | 55 liters. | |

The mass of raw material was permitted to set at 80°-90°C, whereupon the hard mass was disintegrated in a suitable manner to a particle size <4 mm, whereafter the material was transferred to a furnace and heated to 600°C, since practically all water must be removed from the mass in order for the final pore formation not to be destroyed. During this process a primary pore forming process takes place in the material, as the result of a reaction between alkalihydroxide and finely divided metal particles originating from the flue dust.

The primarily expanded material is transferred to moulds without being crushed to smaller particle size, either immediately or subsequent to being cooled, for continued heating to 800° - 850°C for 1 - 2 hours, during which time the final formation of pores takes place.

Subsequent to being chilled quickly to a temperature of approximately 600°C, the product was allowed to cool.

The properties of the foamed glass product thus produced were found to be very satisfactory: uniform pore distribution with closed pores, low volumetric weight 250 kg/m³, good compression strength and very good resistance to water.

EXAMPLE 2

A slurry was prepared by wet grinding the following components:

| | | |
|---|---|---|
| Flue dust | 29.8 kg | |
| Sand | 34.5 kg $SiO_2$-content 74%, | spec. surface 4000 $cm^2/g$ |
| Blast furnace slag | 3.0 kg | |
| Sodium hydroxide | 11.6 kg | |

| | |
|---|---|
| Pyrolusite | 0.9 kg |
| Silicon carbide | 0.2 kg |
| Water | 25 liters. |

The slurry was spray dried to a moisture content of 0.2%. The dried material were transferred to moulds and heated directly to 830°C, whereafter they were cooled as above.

The foamed glass product obtained presented a uniform and well-formed pore structure, while the volumetric weight was measured to 270 kg/m³ and the water resistance was found to be good.

EXAMPLE 3

A slurry was prepared from the following components:

| | | |
|---|---|---|
| Flue dust | 63.6 kg | |
| Clay | 20.3 kg | |
| Portland cement clinker | 1.6 kg | specific surface 4000 cm²/g |
| Sodium hydroxide | 11.5 kg | |
| Pyrolusite | 2.7 kg | |
| Silicon carbide | 0.2 kg | |
| Water | 45 liters. | |

The slurry was treated in the same manner as that in Example 1. The product obtained had a volumetric weight of 300 kg/m³ and fine pore distribution, well closed pores and good water resistance.

EXAMPLE 4

A foamed glass was produced in accordance with Example 1 from the following components:

| | |
|---|---|
| Dust obtained from a macadam manufacturing process | 41.1 kg (rich in feldspar) |
| Dust obtained from quartz crushing operations | 42.3 " |
| Blast furnace slag | 3.0 " |
| Sodium hydroxide | 12.8 " |
| Pyrolusite | 0.5 " |
| Silicon carbide | 0.3 " |
| Water | 20 liters. |

The quality of the product was equal to that of the product obtained in the preceding examples. The volumetric weight was measured at 300 kg/m³.

What we claim is:

1. A method for the manufacture of foamed ceramics comprising 60 – 75% silica from a starting composition capable of forming, when heated, a viscous, sintered and porous mass, said starting composition comprising
   a. at least one silica-containing material selected from the group consisting of:
      fly ash obtained from waste-heat boilers,
      dust removed from waste gases emanating from electrometallurgical processes, and
      dust trapped in stone crushing plants, and
      sand
   and
   b. a product containing both ferrous compounds and readily carboniferous substances,
      said compounds and substances being capable of impairing pore formation,
   which method comprises mixing with the starting composition
   I. silicon carbide, and
   II. a strongly oxidizing agent selected from the group consisting of $MnO_2$, $NaNO_3$ and $KMnO_4$ capable of oxidizing the ferrous compounds into ferric compounds and the carbon of the readily oxidizable carboniferous compounds and the carbon of the SiC into gaseous compounds under the heating process, gaseous compounds from the SiC being formed after the composition has begun to melt, thereby to cause the pore formation to take place.

2. A method according to claim 1 wherein said waste product rich in silica is selected from the group consisting of
   a. fly ash obtained from waste-heat boilers,
   b. dust removed from waste gases emanating from electrometallurgical processes, and
   c. dust trapped in stone crushing plants.

3. A method according to claim 1, wherein said starting composition contains from between approximately 25% and approximately 80% waste product rich in silica.

4. A method according to claim 1 wherein the starting composition contains alkali hydroxide as a fluxing agent.

5. A method according to claim 4 wherein the alkali hydroxide content of the starting composition is 8 – 12% calculated as $R_2O$ on the weight of the finished product, R designating an alkali metal atom.

6. A method according to claim 1 wherein the starting composition is admixed with a hydraulic binding agent or a latent hydraulic binding agent, and wherein the obtained mixture, subsequent to solidifying, is crushed into smaller pieces, which are then heated.

7. A method according to claim 1 wherein the starting composition is prepared in the form of an aqueous mixture and that said mixture is spray dried.

8. A method according to claim 1 wherein the starting composition or the waste product rich in silica is subjected to a roasting process with air to reduce the content of oxidizable substances to a lower level.

* * * * *